Jan. 15, 1963 L. V. GUEST 3,073,540

TAPE RECORDER DRIVE

Filed Dec. 19, 1960 5 Sheets-Sheet 1

INVENTOR

Lawrence V. Guest

BY

Kemon, Palmer & Stewart

ATTORNEY

Jan. 15, 1963 L. V. GUEST 3,073,540

TAPE RECORDER DRIVE

Filed Dec. 19, 1960 5 Sheets-Sheet 2

INVENTOR
Lawrence V. Guest
BY
Kemon, Palmer & Stewart
ATTORNEY

Jan. 15, 1963 L. V. GUEST 3,073,540

TAPE RECORDER DRIVE

Filed Dec. 19, 1960 5 Sheets-Sheet 3

INVENTOR
Lawrence V. Guest
BY
Kemon, Palmer & Stewart
ATTORNEY

Jan. 15, 1963

L. V. GUEST 3,073,540

TAPE RECORDER DRIVE

Filed Dec. 19, 1960

5 Sheets-Sheet 4

INVENTOR

Lawrence V. Guest

BY

Kemon, Palmer & Stewart

ATTORNEY

Jan. 15, 1963 L. V. GUEST 3,073,540

TAPE RECORDER DRIVE

Filed Dec. 19, 1960 5 Sheets-Sheet 5

INVENTOR

Lawrence V. Guest

BY

Kemon, Palmer & Stewart

ATTORNEY

United States Patent Office 3,073,540
Patented Jan. 15, 1963

3,073,540

TAPE RECORDER DRIVE

Lawrence V. Guest, Old Hill, England, assignor to BSR Limited, a British company Filed Dec. 19, 1960, Ser. No. 76,625
4 Claims. (Cl. 242—55.12)

The present invention relates to improvements in and relating to sound recording and reproducing apparatus of the kind utilising a magnetic tape movable between two rotatable spools past one or more transducer heads, the drive of the tape during recording and reproducing being effected by the engagement of the tape with a rotary spindle driven at substantially constant speed by the motor of the machine, the tape being held in frictional engagement with the rotary spindle by engagement of a pressure roller with the tape.

The spools are mounted for rotation with spool carriers and the pull on the tape by the rotary spindle, usually termed the capstan spindle, is utilised to rotate the carrier of the take-off spool whilst the carrier of the take-on spool is driven from the motor through a slipping clutch in such a manner as to maintain tension on the tape between the take-on spool and the capstan spindle.

It is also usual for the pressure roller to be movable by a manual control between positions of engagement and disengagement with the tape and for the spool carriers to be selectively rotatable by the motor at relatively high speed in either direction with the pressure roller in the position of disengagement from the tape, either to effect a rapid rewind of the tape on to the take-off spool or to effect a rapid wind of the tape on to the take-on spool.

It is a principal object of the present invention to provide an improved arrangement of parts, including a control mechanism, for effecting drive of the take-on spool either at a speed appropriate to the movement of the tape during recording or reproducing or at higher speed for effecting rapid wind-on of the tape on to the take-on spool.

In accordance with the invention an apparatus of the kind indicated is provided, having a take-on spool carrier mounted coaxially upon a rotatable drive disc with a friction slip coupling between said spool carrier and said disc, a substantially constant speed drive spindle parallel to the axis of rotation of the rotatable drive disc, a friction wheel on an axis also parallel to the axis of rotation of the rotatable drive disc and rotatable by engagement with the constant speed drive-spindle, and control means for effecting axial movement of said friction wheel between a raised position in the plane of rotation of the take-on spool carrier and between the constant speed spindle and said take-on spool carrier and a lowered position in the plane of rotation of the rotatable drive disc and between the constant speed spindle and the rotatable drive disc, and for effecting driving engagement between the constant speed spindle, the friction wheel and the take-on spool carrier or between the constant speed spindle, the friction wheel and the drive disc beneath the take-on spool carrier.

A second friction wheel mounted on an axis parallel with that of the first mentioned friction wheel may be provided for frictional engagement with the constant speed drive spindle so as to be driven thereby, the said second friction wheel being disposed for engagement with the periphery of a fly wheel fixed on the capstan spindle to drive said capstan spindle at constant speed.

The above described control means for the first mentioned friction wheel may also be utilised to move the pressure roller between its positions of engagement or non-engagement with the tape and the capstan spindle.

The invention is illustrated by way of example in the accompanying drawings and in which FIG. 1 is a plan view of a machine with the parts in a rest or stationary condition.

FIG. 3 is a plan view showing the parts in the positions occupied during rapid wind-on.

Figure 1:
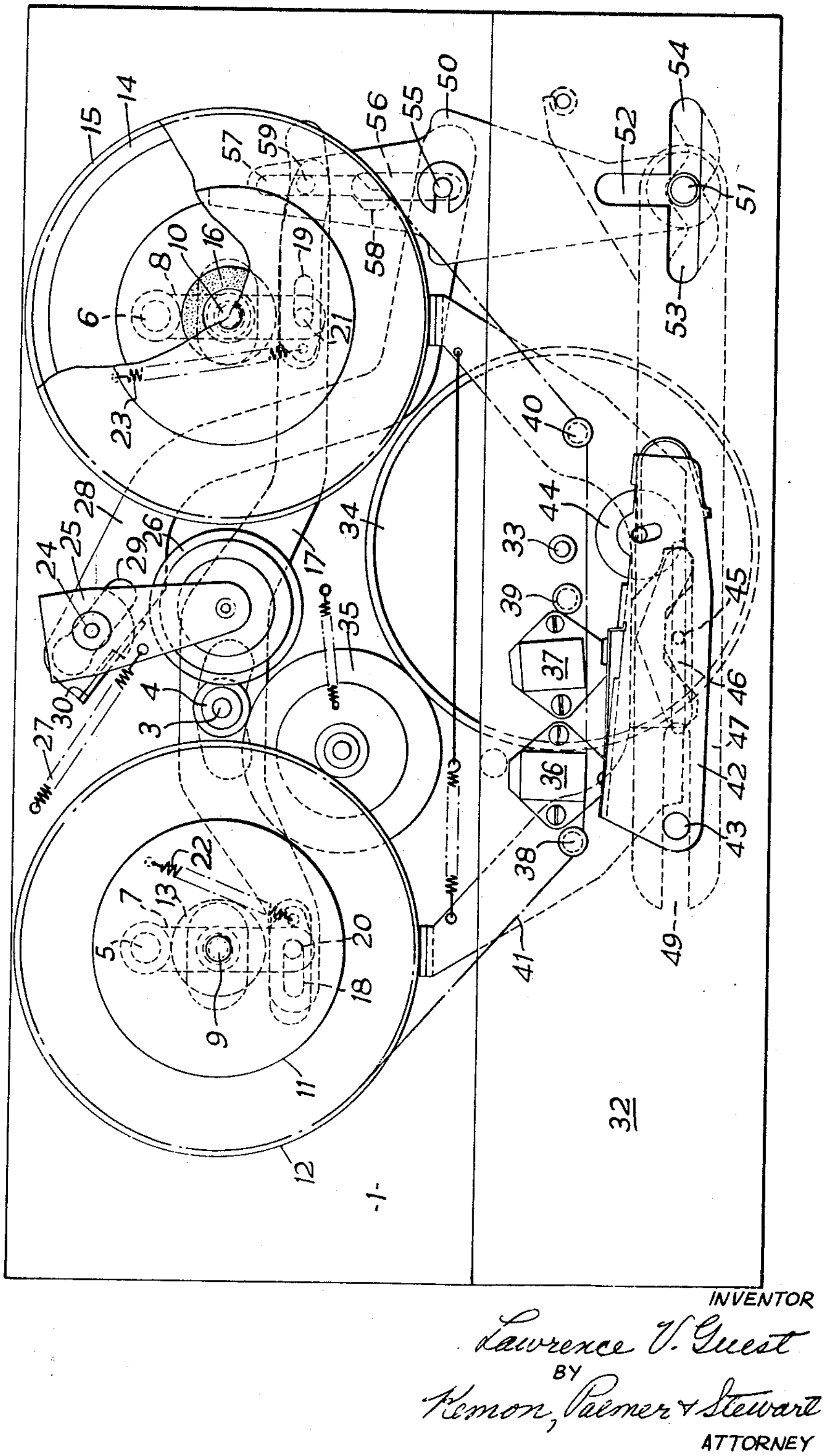

Referring to the drawings the machine shown comprises a base plate 1 having a constant-speed electric motor 2 suspended from its underside, the spindle 3 of the motor extending vertically upwards and carrying above the base plate 1 a friction pulley 4.

On fixed vertical pivots 5 and 6 on the base plate 1 and on substantially diametrically opposite sides of the motor spindle 3 are mounted two similar levers 7 and 8 and in bearings at points approximately mid-way of the length of these levers are rotatably mounted two vertical spindles 9 and 10. On the spindle 9, which will be termed the take-off spindle, is affixed a disc 11 and upon this disc and also engaged over the upper end of the spindle 9 rests a take-off spool carrier 12 with the interposition of a friction washer 13 of felt or the like.

On the spindle 10 which will be termed the take-on spindle is affixed a disc 14 and upon this disc 14 and also engaged over the upper end of the spindle 10 rests a take-on spool carrier 15 with the interposition of a friction washer 16 (FIG. 1) of felt or the like. The disc 14 is of similar diameter to the take-on spool carrier 15 and constitutes the above mentioned drive disc.

A bar 17 extends transversely across the base plate 1 and is provided near each end with elongated slots 18, 19, receiving pins 20, 21 on the free ends of the levers 7 and 8 and tension springs 22 and 23 connected between the base plate and the levers bias the levers 7 and 8 about their pivots 5 and 6 in the direction towards one another and therefore the pins 20 and 21 towards the ends of the two slots 18 and 19 which are nearest to one another.

On a fixed vertical spindle 24 upstanding from the base plate 1 is mounted a yoke-piece 25 so as to be capable of up and down as well as transverse swinging movement thereon and at the underside of the end of the upper limb of the yoke-piece 25 is mounted a friction wheel 26 for rotation about a vertical axis in a plane substantially common to that containing the axes of the motor spindle 3 and the spool carrier spindles 9 and 10.

In the raised position of the yoke-piece 25 and the friction wheel 26 the wheel 26 lies in the plane of rotation of the take-on spool carrier 15 and in the lowered position the friction wheel 26 lies in the plane of rotation of the drive disc 14.

A spring 27 is connected between the yoke-piece 25 and the base plate 1 biasing the yoke-piece and the friction wheel 26 downwards and towards the pulley 4 on the motor spindle 3.

Figure 5:
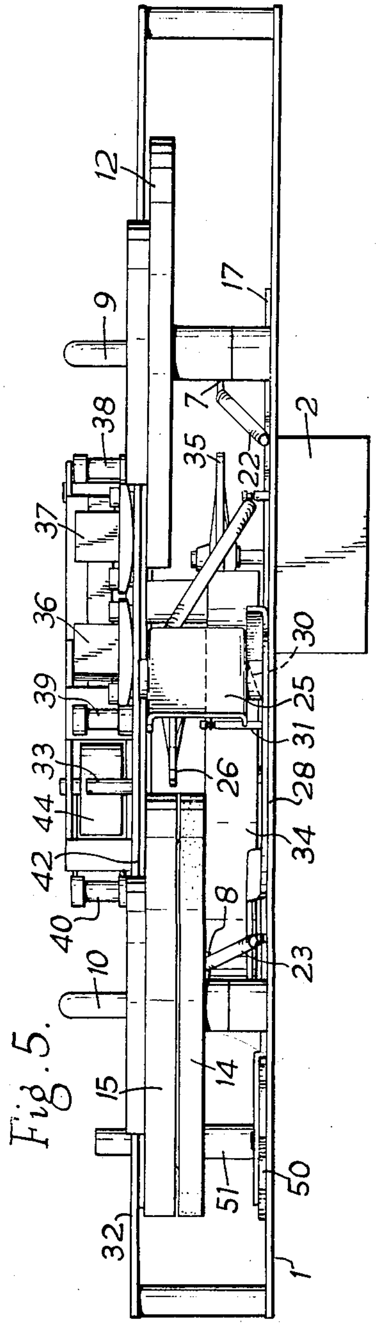
FIG. 5 is a view in rear elevation with the parts in the positions corresponding to those of FIG. 4.
Figure 6:
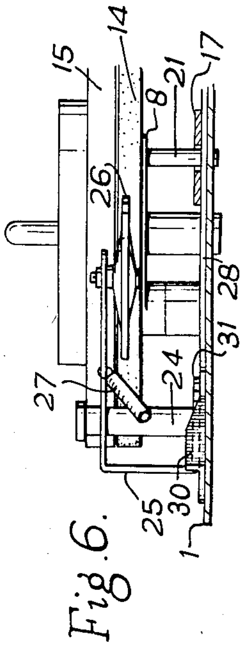
FIG. 6 is a rear elevation showing some of the parts of FIG. 5 in positions corresponding to those of FIG. 2.

A link 28 is mounted for sliding movement on the base plate 1 said link being provided with a slot 29 engaged over the spindle 24 whereby one end of the link 28 is guided, and on the end of the link adjacent the spindle 24 is provided an inclined ramp 30 for engagement below the lower limb 31 (FIGS. 5 and 6) of the yoke-piece to raise or lower the friction wheel 26 according as the link 28 is moved in one direction or the other in the general direction longitudinally of itself in a manner yet to be described.

A fixed bridge plate 32 extends across the front of the base plate 1 in parallel and spaced relation thereto and in suitable fixed bearings is mounted a vertical capstan spindle 33 extending from below to above the bridge piece 32 and on the spindle 33 below the bridge piece is affixed a flywheel 34. A further friction wheel 35 is mounted above the base plate 1 for engagement between the pulley 4 on the motor spindle 3 and the periphery of the flywheel 34 to drive the capstan spindle 33 at constant speed.

Transducer heads 36 and 37 of conventional form are mounted on the bridge piece 32 as well as fixed guide posts 38, 39 and 40 for guiding the loop 41 of record tape extending between tape spools (not shown) carried upon the spool carriers 12 and 15, past the transducer heads 36 and 37 and the capstan spindle 33.

On the bridge piece 32 is mounted a frame 42 pivoted at 43 and providing a support for a yieldingly mounted pressure roller 44 of rubber or the like.

In the underside of the frame 42 is formed an elongated slot 46 into which extends a pin 45 fixed upon and upstanding from a bar 47 mounted for longitudinal sliding and limited horizontal rocking movements with reference to the fixed pivot pin 43 of the frame 42, the pin 43 engaging in a further longitudinal slot 49 formed in the bar 47. Rocking movements of the bar 47 take effect through the pin 45 and slot 46 to move the frame 42 about its pivot 43 either in the direction to engage the roller 44 with pressure against the tape 41 to hold it in driven engagement with the capstan spindle 33 or in the reverse direction to free the tape from such driven engagement with the capstan spindle 33.

Hand operated means are provided for effecting the movements of the bar 17, link 28 and bar 47. Such means consists of a flat lever 50 extending from beneath the bridge piece 32 and over the base plate 1 and capable of both longitudinal and rocking movement.

One end of the lever 50 is provided with an upstanding post 51 accessible to the hand of the user and arranged for guided movements in any one of the three limbs 52, 53 and 54 of a T-shaped slot in the bridge piece 32. The above described bar 47 is pivotally connected with the lever 50 on an axis co-axial with the post 51.

The lever 50 is pivotally connected at a point approximately mid-way of its length with the free end of the link 28 through a pin 55 also arranged for guided movement in an elongated slot 56 formed in the base plate 1 and extending in the general longitudinal direction of the lever 50.

The free end of the lever 50 is provided with an elongated slot 57 the major part of which extends longitudinally of the lever 50 whilst the end of said slot 57 nearest the pin 55 on the lever 50 is offset to one side of and parallel with said major part as shown at 58. The slot 57, 58 is engaged over a pin 59 fixed on the end of the bar 17.

The operation of the machine is as follows:

With the hand operated post 51 on the lever 50 located at the junction of the three limbs 52, 53 and 54 of the T-shaped slot as shown in FIG. 1, the machine is at rest. In this rest position the frame 42 is held by the engagement of the pin 45 in the slot 46 in the bar 47 connected with the post 51 in the position shown in FIG. 1 in which the pressure roller 44 is away from the tape 41 and the capstan spindle 33.

The pin 55 connecting the lever 50 with link 28 is in one end of the slot 56 in the base plate 1 i.e. the lower end in the drawings, in which the link 28 is held with the ramp 30 engaged beneath the lower limb 31 of the yoke-piece 25 so that the yoke-piece and the friction wheel 26 are held in their raised position in which the friction wheel 26 is in the plane of rotation of the take-on spool carrier 15 resting on the drive disc 14.

The pin 59 on the bar 17 is engaged in the major longitudinally extending part of the slot 57 in the lever 50 so that the bar 17 is held in an intermediate position as shown in FIG. 1 in which the adjacent or inner ends of the slots 18 and 19 in the bar form abutments for the pins 20 and 21 on the spring-loaded spool carrier-bearing levers 7 and 8, so that the take-off spool carrier 12 is held away from driving engagement with the pulley 4 on motor spindle 3 and the take-on spool carrier 15 and the rotatable drive disc 14 are held in a position in which there is no driving engagement between the take-on spool carrier 15, friction wheel 26 and the pulley 4 on the motor spindle 3.

Figure 2:
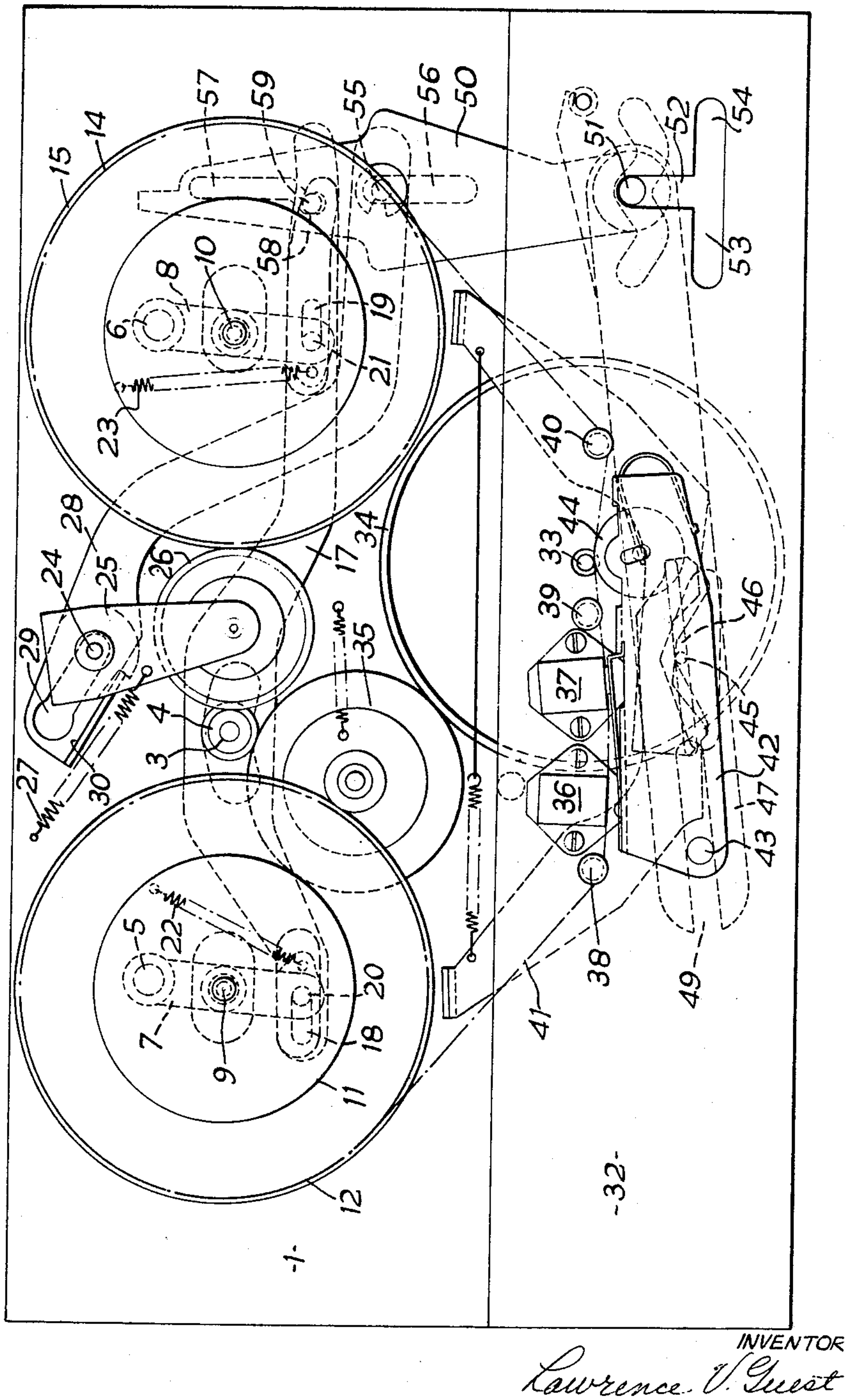
FIG. 2 is a plan view showing the parts in the positions occupied during recording or reproduction.

To initiate recording or reproduction the post 51 is moved into the stem of the T-shaped slot represented by the limb 52 from the position shown in FIG. 1 to that shown in FIG. 2.

This movement involves a linear movement, upwards in the drawings, of the lever 50.

The pin 55 on the lever 50 moves to the upper end of the slot 56 in the base plate 1 and a thrust is imparted to the link 28 such as to move the ramp 30 from below the lower limb of the yoke-piece 25 so that the friction wheel moves downwards into the plane of rotation of the rotatable drive disc 14.

As the lever 50 moves into its uppermost position as shown in FIG. 2, the offset portion 58 of the slot 57 in the lever 50 engages the pin 59 on the bar 17 so that the bar 17 is moved endwise i.e. to the left from the position of FIG. 1 to that of FIG. 2 in which the take-off spool carrier is further away from contact with the pulley 4 on motor spindle 3, against the pull of spring 22 acting upon the spool-bearing pivoted lever 7 whilst the assembly comprising the take-on spool carrier 15 and rotatable drive disc 14 is moved in the direction towards the motor spindle 3, the periphery of the rotatable drive disc 14 making contact with the friction wheel 26 and the friction wheel 26 making contact with the pulley 4 on motor spindle 3 so that the rotatable drive disc 14 is set in rotation.

Movement of the post 51 upwards also effects a rocking movement of bar 47 and the frame 42 is thereby rocked through the engagement of the pin 45 in the slot 46 to cause the pressure roller 44 to press the tape loop 41 against the capstan spindle 33 now being rotated from the motor spindle through the further friction wheel 35 and the flywheel 34 on the capstan spindle 33.

During recording or reproduction the parts are in the positions shown in FIG. 2 and the tape is drawn from the take-off spool on the take-off spool carrier 12 by the pull between the capstan spindle 33 and the pressure roller 44 and is wound onto the take-on spool on take-on spool carrier 15 the latter being driven by the rotatable drive disc 14 itself driven from the pulley 4 on the motor spindle 3 through the friction wheel 26 now in its lowered position, the drive between rotatable drive disc 14 and the take-on spool carrier 15 being through the friction slip coupling disc 16 between them which enables the speed of rotation of the take-on spool carried to accommodate itself to the rate of movement of the tape 41 by the capstan spindle 33.

Figure 3:
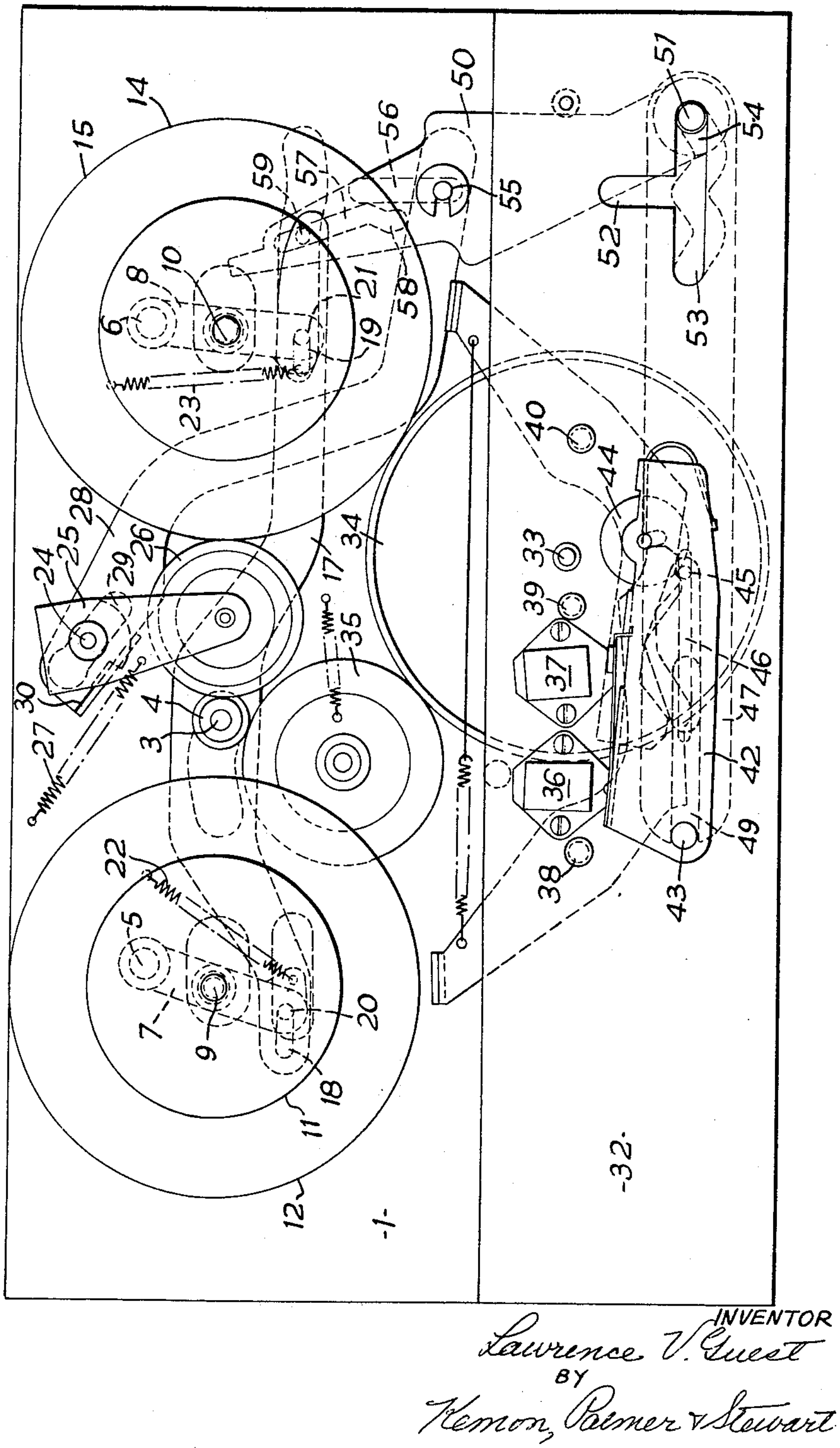

To effect a rapid wind-on of tape on to the take-on spool on take-on spool carrier 15, the post 51 is first returned to the position of FIG. 1 at the junction of the three limbs 52, 53, 54 of the T-shaped slot so that the parts return to the previously described position of rest including movement of the link 17 to reintroduce the ramp 30 beneath the yoke piece 25 and return of the friction wheel into its raised position in the plane of rotation of spool carrier 15. The post 51 is then moved into the limb 54 of the T-shaped slot i.e. to the right in the drawings into the position shown in FIG. 3.

This imparts a transverse swinging movement to the lever 50 about the axis of the pin 55 now at the lower end of the slot 56 in the base plate 1. This movement is without effect on link 17 so that friction wheel 26 remains raised. Engagement of the slot 57 in lever 50 with the pin on bar 17 moves the bar in the direction to bring the periphery of the take-on spool carrier 15 into contact with the friction wheel 26 and the friction wheel into contact with the pulley 4 on motor spindle 3. The bar 47 connected with the post 51 moves with the post 51 in the general longitudinal direction of the bar 47, the pin 45 sliding in the slot 46 so that the frame 42 remains unaffected and the pressure roller remains away from the capstan spindle 33.

In these conditions, the take-on spool carrier 15 is driven relative to the rotatable drive disc 14 beneath it and directly by the friction wheel 26 and pulley 4 so that tape is wound rapidly from the take-off spool 12 on to the take-on spool on the take-on spool carrier 15.

Figure 4:
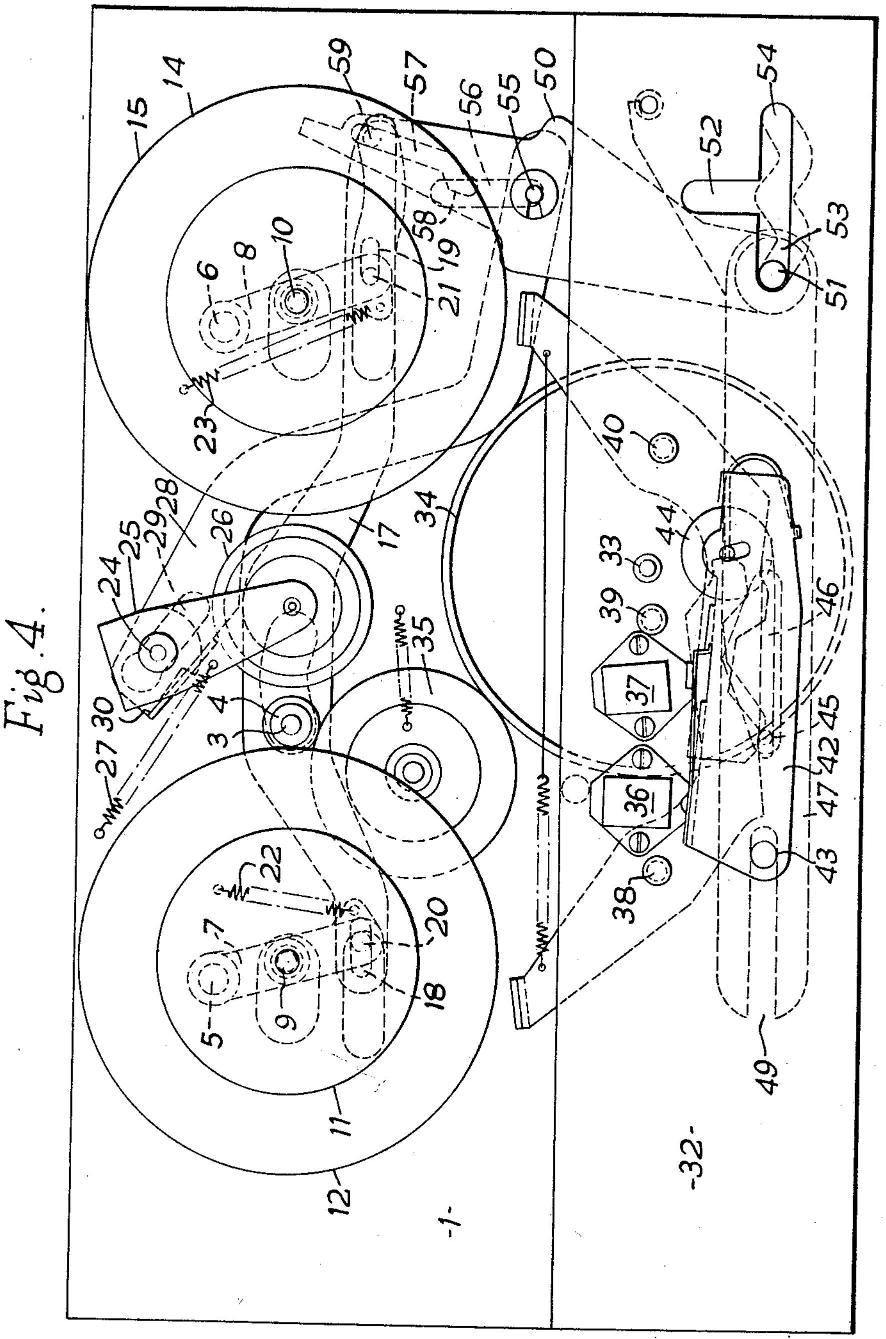
FIG. 4 is a plan view showing the parts in the positions occupied during rapid re-wind.

To effect rapid rewind of the tape 41 on to the take-off spool on take-off spool carrier 12, the post 51 is first moved into the position at the junction of the limb of the T-shaped slot so that the parts assume the rest position of FIG. 1 and is then moved into the limb 53 of the T-shaped slot to the left hand position shown in FIG. 4.

Again a transverse swinging movement of the lever 50 is involved again without effect upon the link 28, so that the friction wheel 26 remains raised, and again without effect upon the frame 42 so that the pressure roller 44 remains away from the tape 41 and the capstan spindle 33.

The bar 17 however is moved in the opposite direction to that previously described, i.e. to the right in the drawings, by the engagement of the pin 59 in the slot 57 in the lever 50.

The take-off spool carrier 12 is thus permitted to move under the pull of the spring 22 on the bearing lever 7, into direct engagement with the pulley 4 on the motor spindle 3, the assembly comprising the rotatable drive disc 14 and the take-on spool carrier 15 thereon moving further away from the motor spindle 3 so that there is no driving engagement between that assembly, the friction wheel 26 and the pulley 4 on the motor spindle 3.

The tape is then drawn from the spool on the take-on spool carrier 15 and wound rapidly on the spool on the take-off spool carrier 12 driven directly by the pulley 4 on the motor spindle 3.

Rapid wind of tape on to the take-on or take-off spools is caused to cease by return of the post 51 to the position at the junction of the three limbs of the T-shaped slot i.e. by setting the machine in the rest position.

I claim:

1. A magnetic tape sound recording and reproducing apparatus comprising a rotatable take-off spool; a rotatable take-on spool; first and second parallel spindles; a take-off spool carrier mounted upon said first spindle and rotating about the axis thereof; a disc mounted upon said second spindle and rotating about the axis thereof; a take-on spool carrier mounted upon and co-axial with said disc; friction slip coupling means providing slip coupling between said disc and said take-on spool carrier; a constant speed drive spindle; a friction wheel between said constant speed drive spindle and the axis of said disc and said take-on spool carrier and rotatable about an axis parallel to the axis of said disc and said take-on spool carrier and movable axially along a further axis also parallel to the axis of said disc and said take-on spool carrier and rotatable by engagement with the said constant speed drive spindle; and control means effecting axial movement of said friction wheel between a lowered position in the plane of rotation of said disc and a raised position in the plane of rotation of the take-on spool carrier mounted on said disc and effecting driving engagement between the constant speed drive spindle, said friction wheel and said disc in said lowered position of said friction wheel and between said constant speed drive spindle, said friction wheel and said take-on spool carrier in the said raised position of said friction wheel.

2. A magnetic tape sound recording and reproducing apparatus comprising a rotatable take-off spool, a rotatable take-on spool; first and second parallel spindles; a take-off spool carrier mounted upon said first spindle and rotating about the axis thereof; a disc mounted upon said second spindle and rotating about the axis thereof; a take-on spool carrier mounted upon and co-axial with said disc; friction slip coupling means providing slip coupling between said disc and said take-on spool carrier; a constant speed drive spindle between and parallel to said first and second spindles; a friction wheel between said constant speed drive spindle and the axis of said disc, rotatable by engagement with said constant speed drive spindle about an axis parallel to the axis of said disc and said take-on spool carrier, and movable axially along a further axis parallel to the axis of said disc and said take-on spool carrier; and control means effecting axial movement of said friction wheel between a lowered position in the plane of rotation of said disc and a raised position in the plane of rotation of the take-on spool carrier mounted on said disc and imparting translational movement in either direction to said first and second parallel spindles, translational movement in one direction effecting driven engagement of the take-off spool carrier with the constant speed drive spindle with interruption of drive between the assembly comprising said disc and the said take-on spool carrier and the constant speed drive spindle, and translational movement in the other direction interrupting the drive engagement between the constant speed drive spindle and the take-off spool carrier and effecting driving engagement between the constant speed drive spindle, said friction wheel and said disc in said lowered position of said friction wheel and between said constant speed drive spindle, said friction wheel and said take-on spool carrier in the said raised position of said friction wheel.

3. Sound recording and reproducing apparatus as claimed in claim 2 and further including: a guide spindle parallel to and spaced from the axis of rotation of said take-on spool carrier; a carrier for said friction wheel mounted for guided rising and falling movement on said guide spindle and rocking movement about the axis of said guide spindle; and in which said control means for effecting axial movement of said friction wheel includes a sliding ramp having sliding engagement beneath said carrier for said friction wheel.

4. Sound recording and reproducing apparatus as claimed in claim 2, and further including a tape-drive spindle driven from said constant speed drive spindle; a pressure roller; a movable support for said pressure roller, movable between two positions relative to said tape-drive spindle and in one position holding the said roller and the tape in driving pressure engagement with said tape-drive spindle; and control means effecting substantially simultaneous translational movement of the pair of parallel spindles, axial movement of the friction wheel and movement of the support for said pressure roller from either one to the other of its two positions relative to the tape-drive spindle.

References Cited in the file of this patent

UNITED STATES PATENTS

| | | |
|---|---|---|
| 2,743,878 | Masterson | May 1, 1956 |
| 2,813,686 | Schroter | Nov. 19, 1957 |